(12) United States Patent
Adachi et al.

(10) Patent No.: US 9,257,728 B2
(45) Date of Patent: Feb. 9, 2016

(54) BATTERY PACK

(71) Applicant: DENSO CORPORATION, Kariya, Aichi-pref. (JP)

(72) Inventors: Yoshiki Adachi, Okazaki (JP); Tatsuya Saito, Obu (JP); Norihiko Ito, Okazaki (JP); Yuya Mizuma, Gamagori (JP)

(73) Assignee: DENSO CORPORATION, Kariya (JP)

(*) Notice: Subject to any disclaimer, the term of this patent is extended or adjusted under 35 U.S.C. 154(b) by 148 days.

(21) Appl. No.: 13/684,431

(22) Filed: Nov. 23, 2012

(65) Prior Publication Data

US 2013/0130071 A1 May 23, 2013

(30) Foreign Application Priority Data

Nov. 23, 2011 (JP) .................................. 2011-255633

(51) Int. Cl.
| | |
|---|---|
| *H01M 2/10* | (2006.01) |
| *H01M 2/20* | (2006.01) |
| *H01M 2/24* | (2006.01) |
| *H01M 10/48* | (2006.01) |
| *H01M 2/12* | (2006.01) |

(52) U.S. Cl.
CPC .......... *H01M 10/482* (2013.01); *H01M 2/1077* (2013.01); *H01M 2/1252* (2013.01); *H01M 2/206* (2013.01)

(58) Field of Classification Search
USPC .................. 429/123, 53–56, 61–64, 149–160, 429/96–100, 7, 163–187; 29/623.1–623.5
See application file for complete search history.

(56) References Cited

U.S. PATENT DOCUMENTS 4,391,882 A * 7/1983 Saruwatari ...................... 429/96
2010/0266887 A1  10/2010 Sekino et al.

FOREIGN PATENT DOCUMENTS

| CN | 101809786 A | 8/2010 |
|---|---|---|
| JP | A-2001-15149 | 1/2001 |
| JP | A-2004-200017 | 7/2004 |
| JP | 2007-027011 * | 1/2007 |
| JP | A-2009-152135 | 7/2009 |
| JP | A-2009-238644 | 10/2009 |
| JP | A-2010-153141 | 7/2010 |

(Continued)

OTHER PUBLICATIONS

Machine Translation of Hideaki et al. (JP 2007-027011, published Jan. 2007, pp. 1-19).*
Apr. 15, 2014 Office Action issued in Japanese Patent Application No. 2011-255633 (with English Translation), (pp. 1-4).
Aug. 4, 2014 Chinese Office Action issued in Chinese Patent Application No. 201210458803.2 (with English-language translation), (pp. 1-15).

(Continued)

*Primary Examiner* — Basia Ridley
*Assistant Examiner* — Caitlin Wilmot
(74) *Attorney, Agent, or Firm* — Oliff PLC

(57) ABSTRACT

A battery pack has battery cells and bus bars. Each of the battery cells is covered with an exterior case. All the battery cells are electrically connected in series through the bus bars. The battery cells are divided into a first stacked group and a second stacked group arranged adjacent to each other in a lateral direction of the battery pack. The battery cells in each stacked group are stacked in a thickness direction of the battery pack. The stacked groups have a different number of the battery cells in order to make a stair structure. An electrode terminal of one end terminal of the battery cells connected in series is arranged adjacent to the stair structure. A control board is arranged on a lower step part of the stair structure. Devices formed on the control board detect a state of each battery cell.

4 Claims, 13 Drawing Sheets

(56) References Cited

FOREIGN PATENT DOCUMENTS

| | | |
|---|---|---|
| JP | A-2010-205509 | 9/2010 |
| WO | WO 2009/041018 A1 | 4/2009 |

OTHER PUBLICATIONS

Sep. 2, 2014 Office Action issued in Japanese Patent Application No. 2011-255633.

* cited by examiner

BATTERY PACK

CROSS-REFERENCE TO RELATED APPLICATION

This application is related to and claims priority from Japanese Patent Application No. 2011-255633 filed on Nov. 23, 2011, the contents of which are hereby incorporated by reference.

BACKGROUND OF THE INVENTION

1. Field of the invention

The present invention relates to battery packs (or battery modules) having a structure in which a plurality of battery cells is electrically connected in series.

2. Description of the Related Art

There is a conventional patent document, Japanese patent laid open publication NO. 2004-200017, which discloses a battery pack having a structure in which a plurality of battery cells is arranged, for example, in three rows and three columns. The battery cells are electrically connected in series.

In the structure of the battery pack disclosed in the conventional patent document, a first battery cell having a negative electrode terminal of the minimum voltage potential and a final battery cell having a positive electrode terminal of the maximum voltage potential are arranged at opposite ends in the same row or in the same column, respectively, on one surface of the battery pack.

The battery pack disclosed in the conventional patent document has a size reduction structure because the battery cells in the battery pack are arranged in three rows and three columns and the negative electrode terminal having the minimum voltage potential and the positive electrode terminal having the maximum voltage potential are formed at the same surface of the battery pack. This structure does not require any connection plate in order to arrange the negative electrode terminal having the minimum voltage potential and the positive electrode terminal having the maximum voltage potential on one end surface of the battery pack. It is therefore possible to decrease the total number of components forming the battery pack and to prevent the strength of the battery pack from being decreased by heat energy.

There is a recent demand and a requirement to promote a downsizing of a battery pack because a device has a limited mounting space in which the battery pack is mounted. Further, there is another demand to reduce the device itself in view of the downsizing.

In order to solve the recent demand of downsizing, the conventional patent document, Japanese patent laid open publication NO. 2004-200017, provides the battery pack having the structure in which battery cells are arranged in three rows and three columns. However, such a structure of the battery pack disclosed in the patent document is insufficient to meet the recent demand and strict requirement.

SUMMARY

It is therefore desired to provide a battery pack (or a battery module) having a structure capable of suppressing a height of a stacked layer in a thickness direction along which battery cells are stacked and of decreasing an electric resistance thereof.

An exemplary embodiment provides a battery pack having an improved structure. The battery pack has a plurality of battery cells and a plurality of bus bars. Each of the battery cells is covered with an exterior case having a rectangular parallelepiped shape. Each of the battery cells has a positive electrode terminal and a negative electrode terminal. The positive electrode terminal and the negative electrode terminal extend from the exterior case. The battery cells are connected in series through the bus bars. In the battery pack according to the exemplary embodiment, the battery cells are divided into a plurality of stacked groups so that the battery cells are stacked in each of the battery stacked groups along a thickness direction of the exterior case of each of the battery cells. All the battery cells are electrically connected in series by the bus bars. One stacked group has a smaller number of the battery cells than the number of the battery cells in the other stacked group. The stacked groups arranged in a battery case having a step shape make a stair structure. The electrode terminal of the battery cell positioned at one end electrode of the battery cells connected in series is arranged adjacent to the stair structure.

In the structure of the battery pack, one stacked group and the other stacked group have a different number of the battery cells. That is, because the stacked groups are arranged to be adjacent to each other, the stair structure is formed between the adjacent stacked groups. One stacked group has a high step part and the other stacked group has a low step part. This makes it possible to suppress the height direction (or the stacked direction) of the battery pack from being increased and to allow various control devices for detecting a state of each battery cell and of controlling the battery cells are arranged on one stacked group as the lower step part of the stair structure. Further, this structure makes it possible to allow a distal end electrode terminal in the electrode terminals of the battery cells electrically connected in series to be adjacent to and close to the stair structure. Still further, this structure makes it possible to shorten the distance between the control devices and the battery cells. These electrode terminals of the battery cells are electrically connected in series through the bus bars. Accordingly, the present invention provides the battery pack of a reduced size along the thickness direction of the battery pack, in which the battery cells are stacked. The structure of the battery pack according to the present invention can decrease an electrical resistance between various components such as the battery cells and the control devices.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
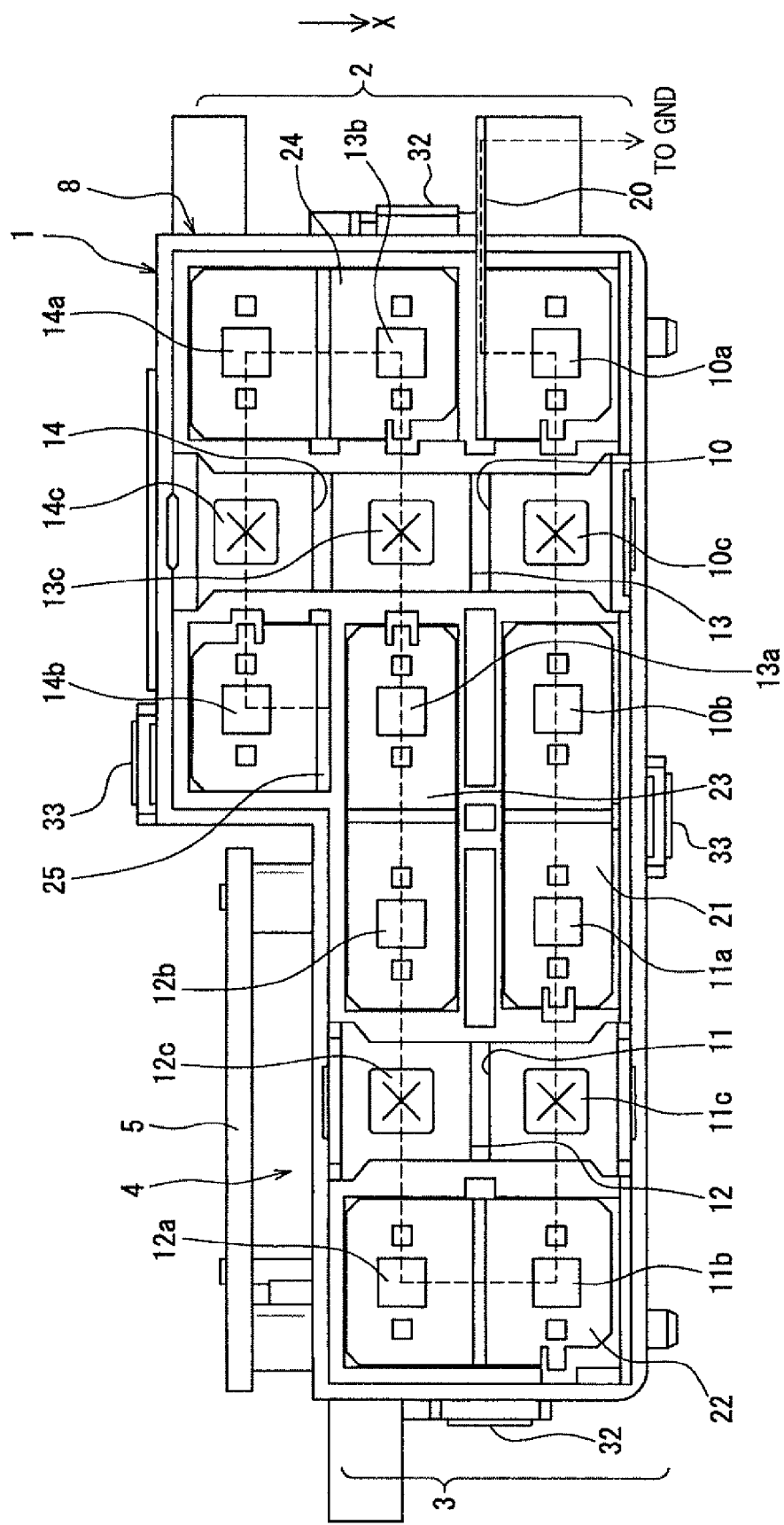
FIG. 1 is a front view showing a battery pack having five battery cells and a control board according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Through the following first to fourth exemplary embodiments according to the present invention, the same components will be referred to as the same reference number and characters for brevity.

First Exemplary Embodiment

A description will be given of a battery pack 1 (or a battery module) according to the first exemplary embodiment with reference to FIG. 1 to FIG. 8.

FIG. 1 is a front view showing the battery pack 1 having five battery cells 10, 11, 12, 13 and 14 and a control board 5 according to the first exemplary embodiment of the present invention.

As shown in FIG. 1, the battery pack 1 has five battery cells 10, 11, 12, 13 and 14, The concept of the present invention does not limit the number of the battery cells. It is therefore possible for a battery pack 1 to have a plurality of battery cells, Each of the battery cells 10, 11, 12, 13 and 14 in the battery pack 1 has an exterior case 10e, 11e, 12e, 13e or 14e and a positive electrode terminal and a negative electrode terminal. The exterior case 10e, 11e, 12e, 13e, 14e of each battery cell is made of aluminum.

In each of the battery cells 10, 11, 12, 13 and 14, the electrode terminals are composed of a positive electrode terminal and a negative electrode terminal. The positive electrode terminal and the negative electrode terminal are projected from one end surface of the exterior case 10e, 11e, 12e, 13e or 14e toward the outside of each battery cell.

When the battery cells 10, 11, 12, 13 and 14 are assembled in the battery pack 1, these positive electrode terminals and the negative electrode terminals of the battery cells 10, 11, 12, 13 and 14 are arranged on one end surface of the battery pack 1 only, not arranged on the both end surfaces of the battery pack 1.

The electrode terminals of the battery cells 10, 11, 12, 13 and 14 are electrically connected in series through bus bars.

The battery pack 1 according to the present invention has an improved arrangement of the bus bars in order to shorten the electric resistance of the connection between the battery cells 10, 11, 12, 13 and 14 and reduce the overall size of the battery pack 1.

As shown in FIG. 1, the battery pack 1 is composed of the five battery cells 10, 11, 12, 13 and 14. For example, the battery pack 1 can be mounted to hybrid motor vehicles and various type electric vehicles.

The hybrid motor vehicle is generally equipped with an internal combustion engine and an electric motor. The electric motor is driven by electric power only supplied from a battery. The electric vehicle is equipped with an electric motor which is driven by electric power supplied from one or more battery packs.

Each of the battery cells 10, 11, 12, 13 and 14 forming the battery pack 1 is a rechargeable battery (or a secondary battery) such as a nickel metal hydride battery, a lithium-ion battery, and an organic radical battery. The battery pack 1 is covered with a battery case 7 having a step shape shown in FIG. 3 and arranged under the seats in the compartment room of a motor vehicle, or a space between a rear seat and a trunk room, or a space between the driver's seat and a front passenger seat of the motor vehicle.

Each of the battery cells 10, 11, 12, 13 and 14 is stored in the respective position in the battery case 7 in order to make an assembly of the battery pack 1. The improved structure of the battery case 7 according to the first exemplary embodiment will be explained later with reference to FIG. 3 to FIG. 8.

Figure 3:
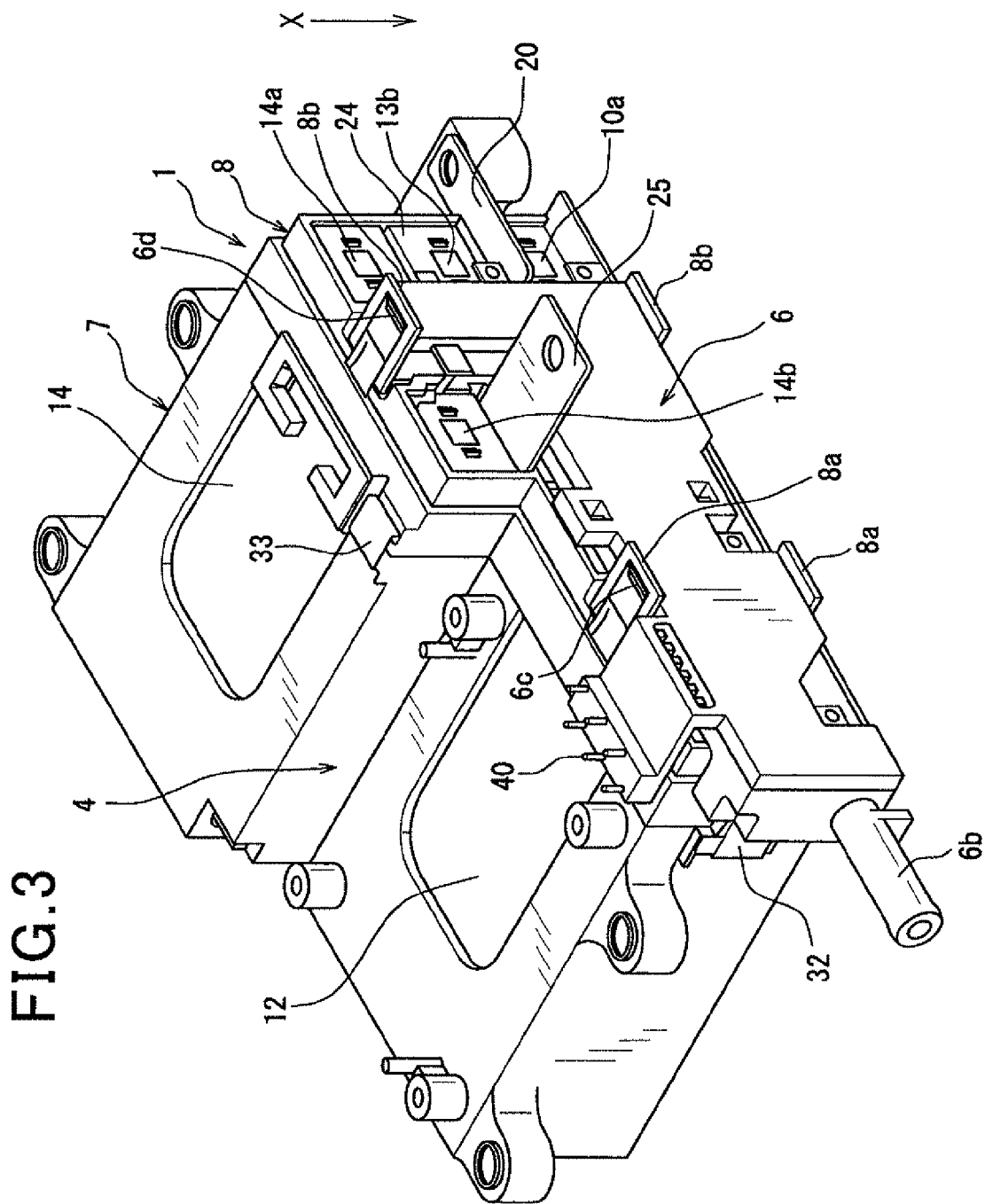
FIG. 3 is a perspective view showing the arrangement of the battery pack having the discharge duct according to the first exemplary embodiment of the present invention.

FIG. 3 is a perspective view showing the arrangement of the battery pack 1 having the discharge duct 6 according to the first exemplary embodiment of the present invention.

As shown in FIG. 1, the five battery 10, 11, 12, 13 and 14 are divided into a first stacked group 2 and a second stacked group 3. In each of the first stacked group 2 and the second stacked group 3, the battery cells are stacked along the thickness direction X (or a vertical direction) of the exterior case 10e, 11e, 12e, 13e or 14e of each battery cell.

In particular, the battery cell 10, the battery cell 13 and the battery cell 14 are stacked along the thickness direction X in order in the first stacked group 2. The battery cell 11 and the battery cell 12 are stacked in order along the thickness direction X in the second stacked group 3. In particular, the battery cells are stacked along the thickness direction X in each of the first stacked group 2 and the second stacked group 3 so that the battery cells face to each other on the maximum surface area. The thickness direction X of each battery cell is the direction along which the first stacked group 2 and the second stacked group 3 are stacked in the battery pack 1. In other words, each of the first stacked group 2 and the second stacked group 3 has a structure in which the battery cells are stacked flat.

A negative electrode terminal 10a of the battery cell 10 is electrically connected to a bus bar 20. The bus bar 20 is fixed to a body of a motor vehicle by one or more screws. This makes it possible to connect the negative electrode terminal 10a of the battery cell 10 to the ground voltage potential. That is, the gegative electrode terminal 10a of the battery cell 10 is earthed or grounded.

One end of the bus bar 20 is extended from the bottom side of the first stacked group 2 toward the side direction of the battery case 7 having a step shape shown in FIG. 3, namely, extended along the side direction which is perpendicular to the thickness direction X.

A positive electrode terminal 10b of the battery cell 10 is electrically connected to a negative electrode terminal 11a of the battery cell 11 through a bus bar 21.

A positive electrode terminal 11b of the battery cell 11 is electrically connected to a negative electrode terminal 12a of the battery cell 12 through a bus bar 22.

A positive electrode terminal 12b of the battery cell 12 is electrically connected to a negative electrode terminal 13a of the battery cell 13 through a bus bar 23.

A positive electrode terminal 13b of the battery cell 13 is electrically connected to a negative electrode terminal 14a of the battery cell 14 through a bus bar 24.

A positive electrode terminal 14b of the battery cell 14 is electrically connected to a bus bar 25. The bus bar 25 is electrically connected to a power board 50 by one or more screws or by soldering.

As designated by the dotted line shown in FIG. 1, the above electrical connection makes it possible to electrically connect all of the battery cells 10 to 14 in the battery pack 1 in series through the bus bars 20 to 25. A current flow in the battery cells connected in the battery pack 1 through the electrical connection through the bus bars 20 to 25. In other words, the battery pack 1 according to the first exemplary embodiment has an improved structure in which the bus bars 20 to 25 electrically connect the battery cells 10, 11, 12, 13 and 14 in a vertical direction and a crosswise direction only, do not connect the battery cells 10, 11, 12, 13 and 14 in an oblique direction or a curved direction.

The exterior case 10e, 11e, 12e, 13e or 14e of each of the battery cells 10, 11, 12, 13 and 14 is equipped with a safety valve. The safety valve is arranged between the positive electrode terminal and the negative electrode terminal. When an inside pressure of each battery cell exceeds a predetermined pressure value, namely, has an abnormal value, the safety valve is broken. For example, the safety valve is made of a thin metal film. The safety valve is composed of such a thin metal film and a hole which is formed in the exterior case 10e, 11e, 12e, 13e or 14e of each battery cell. The hole is covered with the thin metal film. When the inside of the battery case of the battery cell has a gas having an excess pressure, the thin metal film covering the hole is broken, and the gas having an excess pressure is released from, namely, discharged to the outside of the exterior case 10e, 11e, 12e, 13e or 14e through the hole. This makes it possible to decrease the pressure of the inside of the battery case of the battery cell. This prevents the battery cell itself from being broken. As shown in FIG. 1, a safety valve 10c of the exterior case 10e of the battery cell 10, a safety valve 13c of the exterior case 13e of the battery cell 13, and the safety valve 14c of the exterior case 14e of the battery cell 14 are arranged along the thickness direction X. Further, the safety valve 11c of the exterior case 11e of the battery cell 11 and the safety valve 12c of the exterior case 12e of the battery cell 12 are arranged along the thickness direction X.

Figure 5:
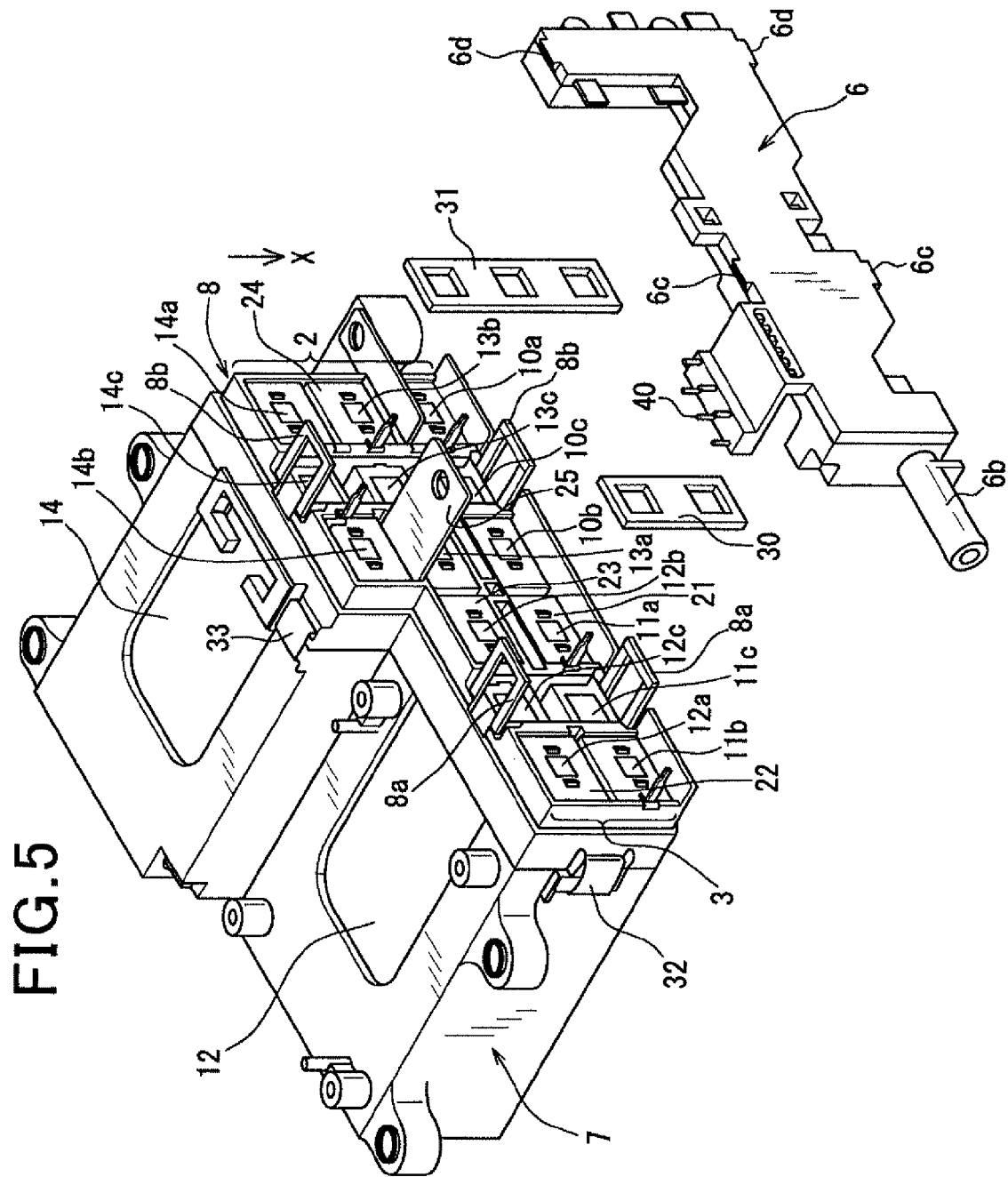
FIG. 5 is an exploded perspective view showing a configuration of the battery pack having the discharge duct according to the first exemplary embodiment of the present invention.
Figure 6:
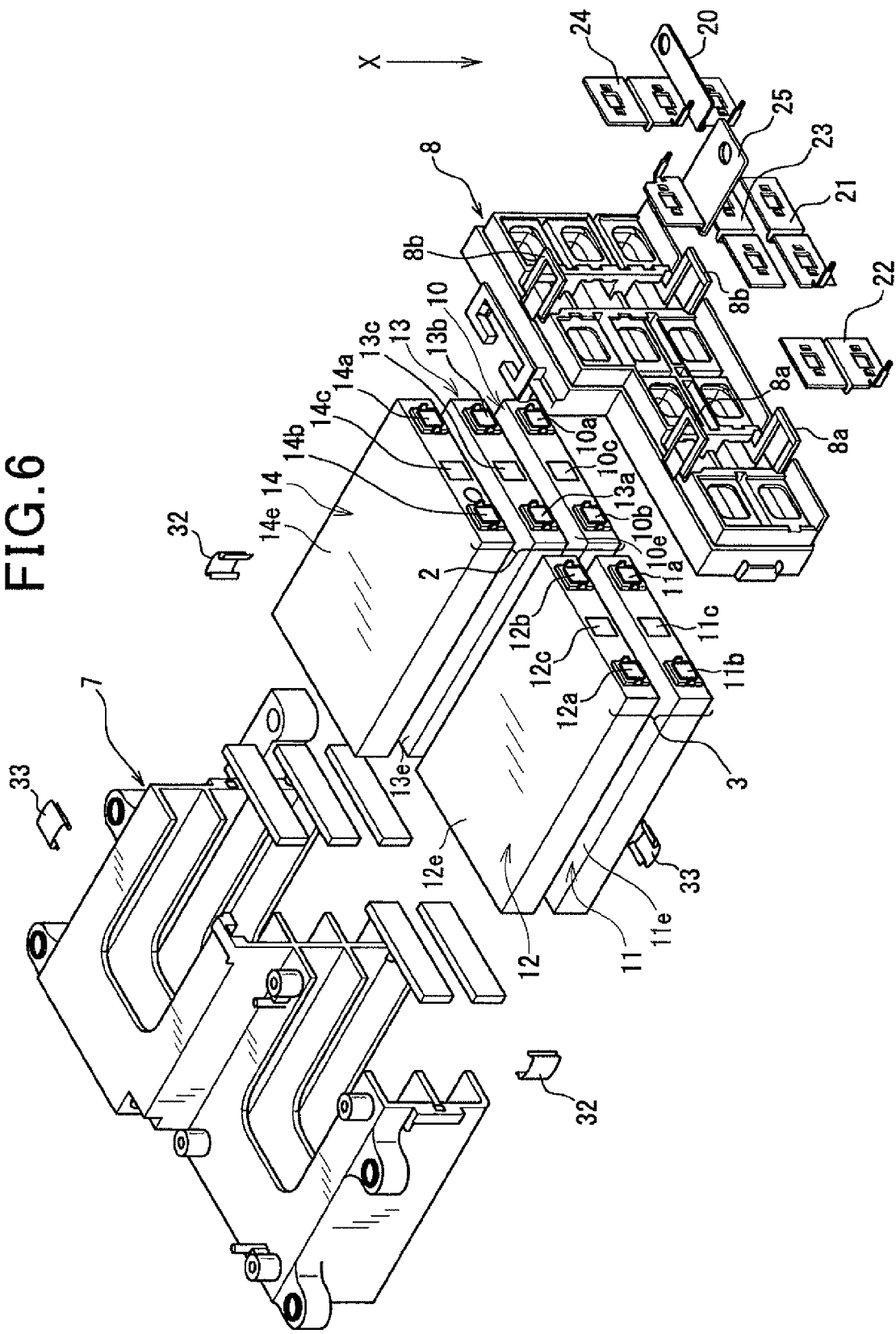
FIG. 6 is an exploded perspective view showing the configuration of the battery pack according to the first exemplary embodiment of the present invention.

FIG. 5 is an exploded perspective view showing a configuration of the battery pack 1 equipped with the discharge duct 6 according to the first exemplary embodiment of the present invention. FIG. 6 is an exploded perspective view showing the configuration of the battery pack 1 according to the first exemplary embodiment of the present invention.

In FIG. 6, the battery cells 10, 11, 12, 13 and 14, an insulation cover 8, and the bus bars 20, 21, 22, 23, 24 and 25 are separated from the battery case 7. The discharge duct 6 is shown in FIG. 5, but omitted from FIG. 6.

As shown in FIG. 5 and FIG. 6, an insulation cover 8 electrically insulates the bus bars 20, 21, 22, 23, 24 and 25 from the exterior cases 10e, 11e, 12e, 13e and 14e of the battery cells 10, 11, 12, 13 and 14. The insulation cover 8 covers one end surface of the exterior case excepting the safety valves 10c, 11c, 12c, 13c and 14c and electrode terminals.

That is, one end surface of each of the exterior cases 10e, 11e, 12e, 13e and 14e is covered with the insulation cover 8. The insulation cover 8 has a plurality of opening parts.

The opening parts formed in the insulation cover 8 correspond in position to the safety valves 10c, 11c, 12c, 13c and 14c, respectively. When the battery case 7 equipped with the battery cells 10, 11, 12, 13 and 14, the insulation cover 8 and the bus bars 20, 21, 22, 23, 24 and 25 are assembled, as shown in FIG. 6, the electrode terminal is smaller in size than the corresponding opening part formed in the insulation cover 8.

When the battery cells 10, 11, 12, 13 and 14 stored in the battery case 7 and the insulation cover 8 are assembled together, each of the safety valves 10c, 11c, 12c, 13c and 14c and the electrode terminals is exposed to the outside of the battery pack 1 through the corresponding opening part.

The insulation cover 8 has a plurality of depression parts in order to execute the positioning of the bus bars 20, 21, 22, 23, 24 and 25 on the insulation cover 8, The number of the depression parts formed in the insulation cover 8 corresponds to the number of the bus bars. That is, in the battery pack 1 according to the first exemplary embodiment, the number of the depression parts is six. An opening part is formed in each of the bus bars 20, 21, 22, 23, 24 and 25, through which an electrode terminal of the battery cell is inserted.

When the bus bar is fitted to the corresponding opening part formed in the insulation cover 8, the electrode terminal is fitted to the opening part of the corresponding bus bar, the positioning between the battery cell and the corresponding bus bar is correctly performed.

When the positioning between the depression parts formed in the insulation cover 8 and the bus bars 20, 21, 22, 23, 24 and 25 is finished, each of the bus bars 20, 21, 22, 23, 24 and 25 is fixed to the insulation cover 8. This makes it possible to easily fix the bus bars 20, 21, 22, 23, 24 and 25 to the insulation cover 8 and to easily fix the electrode terminals to the battery cells 10, 11, 12, 13 and 14 by soldering, etc. with high accuracy. Still further, this makes it possible to prevent the bus bars 20, 21, 22, 23, 24 and 25 from being contacted with other components and to avoid a short circuit between them from being made. This prevents the components of the battery pack 1 from being damaged and broken.

Figure 4:
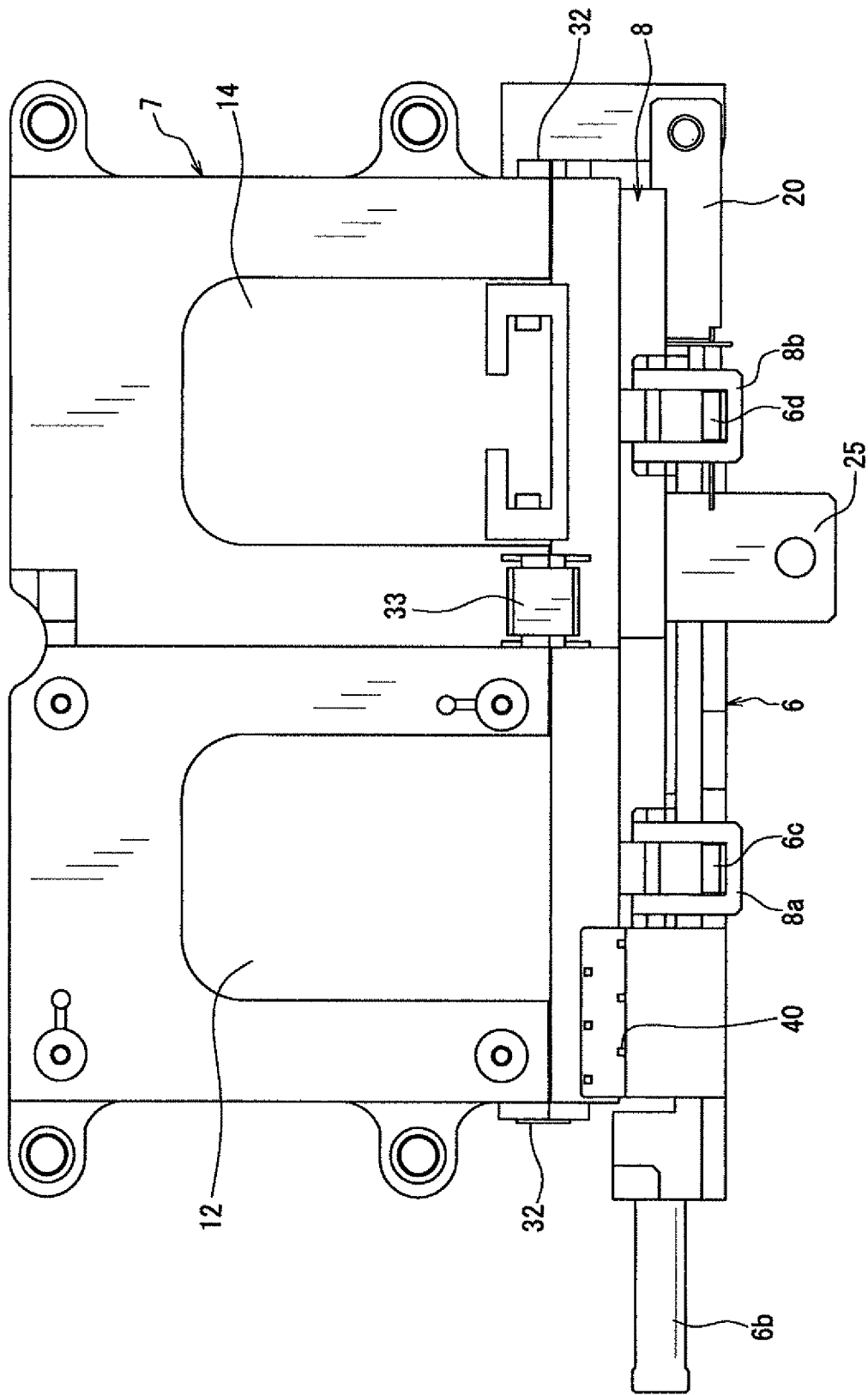
FIG. 4 is a plan view showing the arrangement of the battery pack having the discharge duct according to the first exemplary embodiment of the present invention.

On executing the electrical connection between the electrode terminals to each other through the corresponding bus bar, each of the battery cells 10, 11, 12, 13 and 14 is inserted to the corresponding space in the battery case 7. Next, the insulation cover 8 is fitted to the battery case 7 with the battery cells 10, 11, 12, 13 and 14. At this time, the upper part and the bottom part of the battery case 7 and the insulation cover 8 are tightened together by two clips 33, for example as shown in FIG. 4. Both the right and left sides of the battery case 7 and the insulation cover 8 are tightened by two clips 32.

Next, the bus bars are fitted to the corresponding depression parts formed in the insulation cover 8. The insulation cover 8 has been assembled together with the battery case 7 with the battery cells 10, 11, 12, 13 and 14. The electrode terminal has been inserted in the corresponding opening part formed in each of the bus bars. The electrode terminals are fixed to the bus bars by welding such as laser beam welding and arc welding.

The second stacked group 3 stores the smaller number of the battery cells, when compared with the number of the battery cells stacked in the first stacked group 2. That is, the first stacked group 2 stores the three battery cells 10, 13 and 14 which are stacked in order. On the other hand, the second stacked group 3 contains the two battery cells 11 and 12 which are also stacked in order.

The first stacked group 2 and the second stacked group 3 make a stair structure 4, as clearly shown in FIG. 1 and FIG. 3, because there is a difference of the number of the battery cells between the first stacked group 2 and the second stacked group 3.

FIG. 4 is a plan view showing the arrangement of the battery pack 1 having the discharge duct 6 according to the first exemplary embodiment of the present invention.

The control board 5 is omitted from the structure shown in FIG. 3 and FIG. 4.

In the structure of the battery pack 1 according to the first exemplary embodiment, the thickness of the stair structure 4 corresponds approximately to a thickness of one battery cell. As shown in FIG. 1, the control board 5 is arranged on a surface of a lower step part od the stair structure 4. Devices are formed on the surface of the control board 5. The Devices detect conditions of the battery cells 10, 11, 12, 13 and 14. For example, these devices mounted on the control board 5 detect a state of each of the battery cells 10, 11, 12, 13 and 14. The stair structure 4 with the control board 5 makes it possible to suppress the height of the battery pack 1 from being increased in the thickness direction X of the battery pack 1. It is preferable that the upper surface of the control board 5 is arranged below the upper surface of the adjacent first stacked group 2 in view of the thickness direction X of the battery pack 1. The control board 5 is fixed to boss parts formed on the battery case 7 (having a step shape making a stair structure) with the battery cells 10, 11, 12, 13 and 14 by screws.

In the battery pack 1 according to the first exemplary embodiment, a positive electrode terminal 14b of the battery cell 14 having the maximum voltage potential is arranged at the position which is adjacent to the stair structure 4. The power board 50 is electrically connected to a terminal block 51. Through the terminal block 51, the power board 50 is further connected to the control board 5 and a motor vehicle (not shown) equipped with the battery back 1 according to the first exemplary embodiment. As previously described, all of the battery cells 10, 11, 12, 13 and 14 in the first stacked group 2 and the second stacked group 3 are connected in series through the bus bars 10, 21, 22, 23, 24 and 25.

Figure 2:
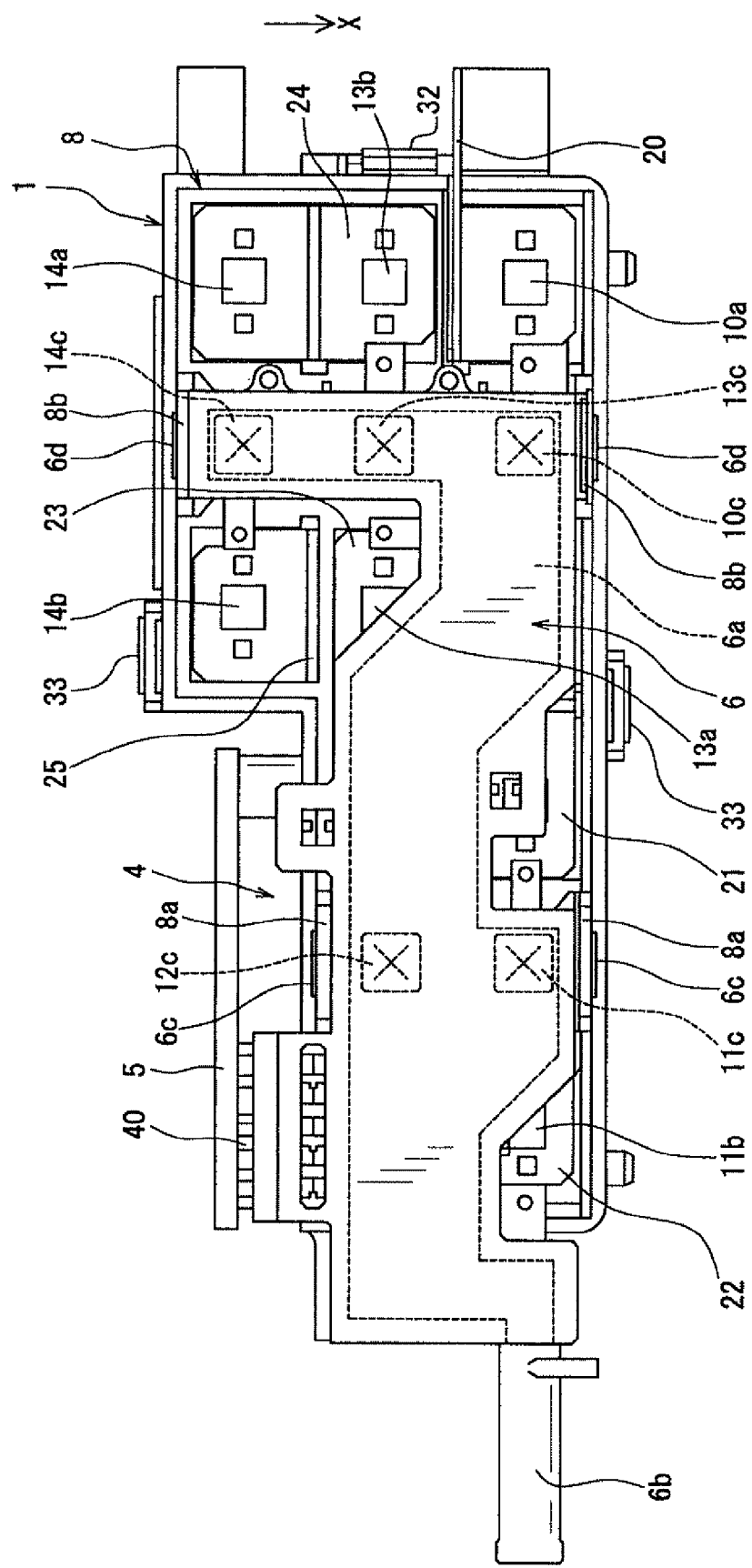
FIG. 2 is a front view showing a structure of a discharge duct and an arrangement of the safety valves in the battery pack according to the first exemplary embodiment of the present invention.

FIG. 2 is a front view showing a structure of a discharge duct 6 and the safety valves 10c, 11c, 12c, 13c and 14c in the battery pack 1 according to the first exemplary embodiment of the present invention.

As shown in FIG. 2, the battery pack 1 has the discharge duct 6. The safety valves 10c, 11c, 12c, 13c and 14c are exposed to the inside of a discharge passage 6a formed in the discharge duct 6.

The discharge duct 6 is made of material having heat resistance, for example, polyphenylene sulfide (PPS), polyethylene resin (PE), or various types of resin containing heat resistant agent.

The heat resistance of such material prevents the discharge duct 6 from being melted even if a temperature of the inside of the battery cell reaches an extreme high temperature, and a high pressure gas breaks or opens the safety valve and discharges to the inside of the discharge passage 6a of the discharge duct 6.

The insulation cover 8 has an electric insulation capability, and is made of plastic (synthetic resin) such as polypropylene resin (PP resin), polypropylene resin (PP resin) containing filler or talc, for example.

It is preferable for the insulation cover 8 is made of heat resistance resin like the discharge duct 6.

The discharge duct 6 has a cylindrical shape extending along a lateral or horizontal direction of the battery pack 1. When the discharge duct 6 is assembled with the insulation cover 8, the opening parts formed in the discharge duct 6 are larger in size than the corresponding safety valves 10c, 11c, 12c, 13c and 14c.

An outer periphery edge part of the opening part formed in the discharge duct 6 is adhered to the surface of the exterior cases 10e, 11e, 12e, 13e and 14e around the safety valves 10c, 11c, 12c, 13c and 14c through packing members 30 and 31 when the discharge duct 6 is assembled with the insulation cover 8. In other words, the packing members 30 and 31 are sandwiched between the discharge duct 6 and the insulation cover 8.

To use the packing members 30 and 31 can increase the air tightness between the discharge duct 6 and the insulation cover 8 when discharge duct 6 and the insulation cover 8 are assembled.

The discharge duct 6 has an introduction duct part 6b which communicates with the discharge passage 6a to form into an inside passage extending from a side part to the outside of the discharge duct 6, as shown in FIG. 2, FIG. 3, FIG. 4 and FIG. 5.

Through the introduction duct part 6b, gas can be emitted to the discharge passage 6a and to outside the battery pack 1.

It is possible to use soft resin such as elastomer by double molding instead of using the packing members 30 and 31 in order to push and fix the peripheral part of the safety valves 10c, 11c, 12c, 13c and 14c in the discharge duct 6.

A voltage detection terminal 40 is formed in the discharge duct 6 so that the voltage detection terminal 40 projects toward the upper side of the stair structure 4. As shown in FIG. 2, the discharge duct 6 is connected to the control board 5. A voltage detection sensor detects a predetermined voltage potential of the battery pack 1. The voltage detection sensor outputs a detection signal to the control board 5 through the voltage detection terminal 40.

The discharge duct 6 is equipped with claw parts 6c which protruding towards outside at an upper side and a bottom side in the thickness direction X (in a vertical direction) at a center part in a lateral direction of the discharge duct 6. Further, the discharge duct 6 is equipped with claw parts 6d which protrudes towards outside at the upper side and the bottom side in the thickness direction X at a side part in the lateral direction of the discharge duct 6.

On the other hand, the insulation cover 8 is equipped with two engagement parts 8a. Each of the engagement parts 8a has a hole part. The hole part of each engagement part 8a is fitted with the corresponding claw part 6c. The insulation cover 8 is further equipped with two engagement parts 8b. Each of the engagement parts 8a has a hole part. The hole part of each engagement part 8b is fitted with the corresponding claw part 6d.

When the discharge duct 6 is assembled with the insulation cover 8, each of the two claw parts 6c in the discharge duct 6 is fitted to the corresponding engagement part 8a in the insulation cover 8, and each of the two claw parts 6d in the discharge duct 6 is fitted to the corresponding engagement part 8b in the insulation cover 8. This structure fixes the discharge duct 6 to the insulation cover 8 and prevents the discharge duct 6 from being moved. Further, when the discharge duct 6 is assembled with the insulation cover 8, this structure makes it possible to press the packing parts 30 and 31 so that the discharge duct 6 is pushed toward the insulation cover 8. That is, this makes it possible to increase the sealing between the surface of each of the safety valves 10c, 11c, 12c, 13c and 14c and the discharge passage 6a in the discharge duct 6.

Figure 7:
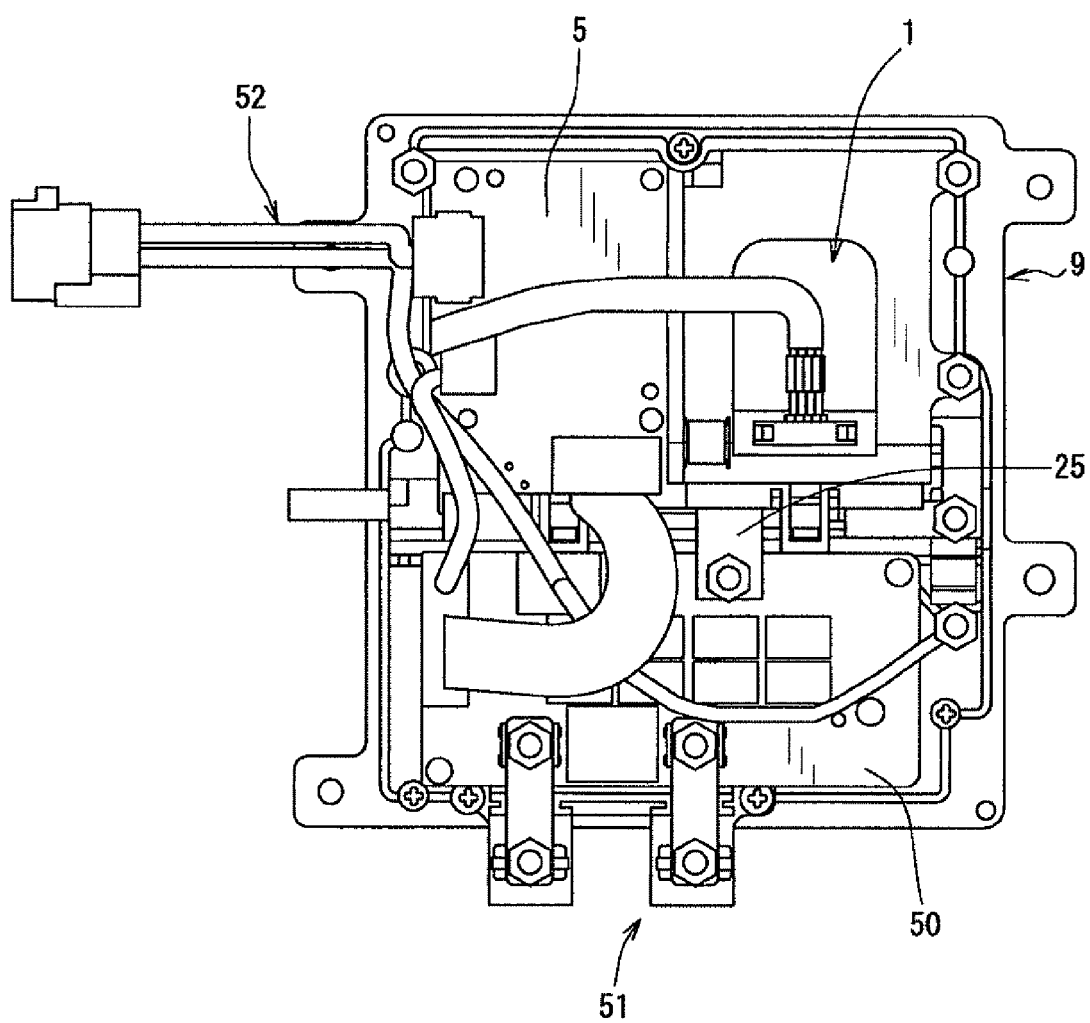
FIG. 7 is a plan view showing a structure in which a cover case is removed from the battery pack according to the first exemplary embodiment of the present invention.
Figure 8:
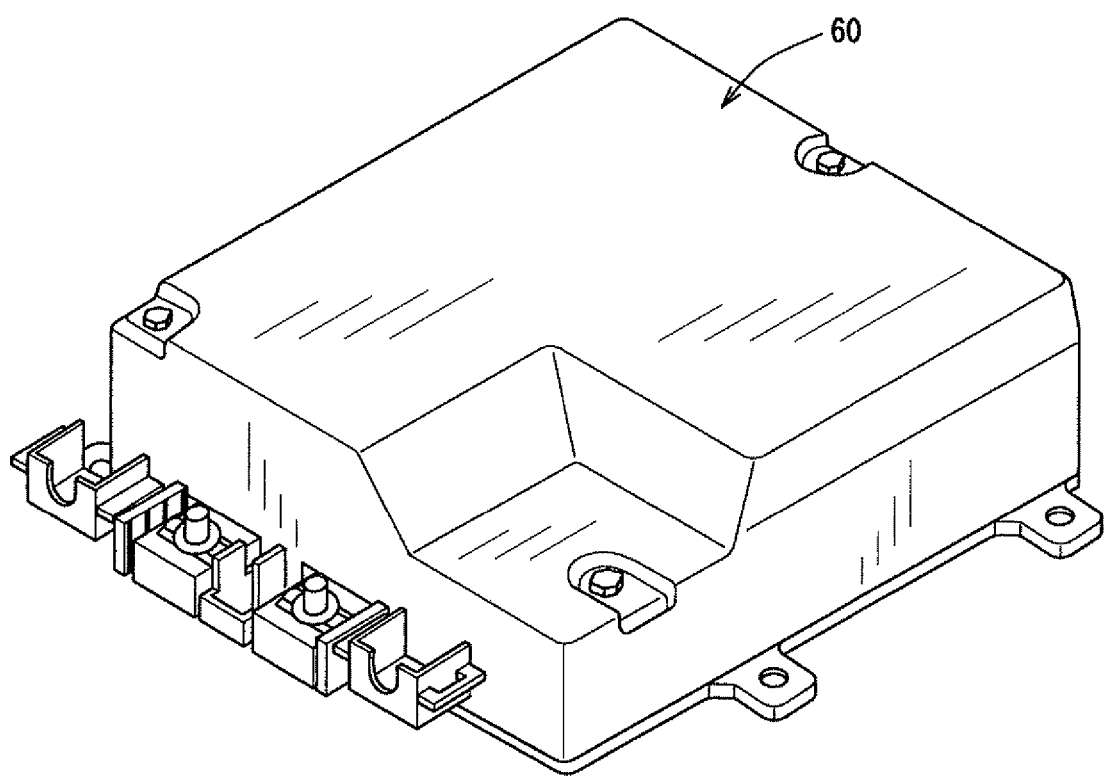
FIG. 8 is a perspective view showing a structure of the battery pack with the cover case according to the first exemplary embodiment of the present invention.

FIG. 7 is a plan view showing a structure in which the cover case 60 is removed from the battery pack 1 according to the first exemplary embodiment of the present invention. FIG. 8 is a perspective view showing a structure of the battery pack 1 with the cover case 60 according to the first exemplary embodiment of the present invention.

As shown in FIG. 7, the main components such as the battery pack 1, the power board 50 and the terminal block 51 are mounted on the floor plate 9. The main components of the battery pack 1 are power board 50, and the terminal block 51. The control board 5 is mounted on and fixed to the battery pack 1. For example, in order to increase the strength of the floor plate 9, the floor plate 9 is made of polypropylene (PP) or plastic of polypropylene containing filler or talc having an electric insulation capability.

The floor plate 9 has fixing parts and mounting parts. The floor plate 9 is fixed to a motor vehicle (not shown) through the fixing parts by bolts. The battery pack 1, etc. is covered with the cover case 60. The cover case 60 is fixed to floor plate 9 by using packing members and bolts.

A battery monitor device is an electric control unit (ECU) which monitors the state of the battery pack 1. The battery monitor device is electrically connected to the battery pack 1 through detection wires extended from detection terminals of the battery pack 1. The detection wires are communication lines to transmit information regarding a voltage, a temperature, etc. of the battery pack 1 to the ECU as the battery monitor device.

The detection terminals contain various types of sensors such as a voltage detection element, a temperature sensor, and other detection sensors.

The battery pack 1 is equipped with various electronic components which are capable of monitoring charging, discharging and temperature of each of the battery cells 10, 11, 12, 13 and 14.

Those electronic components are, for example, a direct current to direct current (DC/DC) converter, inverters, power elements mounted on the power board 50, electronic components mounted to the control board 5, various types of electronic control devices.

Further, the battery pack 1 has the battery monitor device, as previously described, a control device and a wire harness of wires. As previously described, the battery monitor device receives various types of detection signals transferred from various types of sensors which detect a voltage and a temperature of each battery cell. The control device communicates with the battery monitor device and controls electric power transmission to the DC/DC converter. The control device controls the operation of motors of one or more electric fans. Those devices in the battery pack 1 are electrically connected through the wires of the wire harness. It is possible for the battery pack 1 to have an air blower to cool each of the battery cells.

Next, a description will now be given of the effects of the battery pack 1 having the structure previously described.

As previously described, the battery pack 1 has the battery cells 10, 11, 12, 13 and 14 and the bus bars 10, 21, 22, 23, 24 and 25. Through the bus bars 10, 21, 22, 23, 24 and 25, the electrode terminals 10a, 10b, 11a, 11b, 12a, 12b, 13a, 13b, 14a and 14b of the battery cells 10, 11, 12, 13 and 14 are connected in series on one end surface of the batter. The battery cells 10, 13 and 14 are stacked to form into the first stacked group of the battery cells, and the second stacked group of the battery cells 11 and 12. All the battery cells 10, 11, 12, 13 and 14 are electrically connected in series. At least one stacked group (namely, the second stacked group 3) is lower in height than the other stacked group (namely, the first stacked group 2). The difference in height between the first stacked group 2 and the second stacked group makes it possible to form into the stair structure 4. The electrode terminals through which the battery cells are electrically connected in series are arranged adjacent to the stair structure 4.

The structure of the battery pack 1 according to the first exemplary embodiment makes it possible to provide the stair structure 4 formed by the difference in height between the first stacked group 2 and the second stacked group 3.

This structure of the battery pack 1 makes it possible to suppress the height of the battery pack 1 in the thickness direction X from being increased. In addition, the structure of the battery pack 1 makes it possible to provide the stair structure 4 on which the component such as the control board 5 is mounted. This makes it possible to reduce the overall size of the battery pack. Still further, the structure of the battery pack 1 makes it possible to arrange the electrode terminals adjacent to the stair structure 4. This makes it possible to shorten the distance between the components such as the battery cells, and to decrease the electric resistance of the components. This structure of the battery pack 1 can decrease the overall size thereof, provide easy of mounting to a motor vehicle, and decrease the manufacturing cost thereof.

In addition, there is a possibility for it being difficult to have a rectangular parallelepiped shape or a cuboid shape of the battery pack. For example, when the number of battery cells is an even number which is difficult to form into a rectangular parallelepiped shape. In this case, it is possible for the present invention to provide a battery pack having easy of mounting to devices such as motor vehicles, having a reduced length of wires, and having a simple structure.

Still further, through the packing members 30 and 31, the discharge duct 6 is directly or indirectly adhered to the end surface of the exterior cases of the battery cells, around the periphery part of each safety valve. This structure makes it possible to increase the adhesion between the discharge duct 6 and the end part of each of the exterior cases 10e, 11e, 12e, 13e and 14e, and to increase the sealing capability between them to prevent gas from being discharged to outside of the battery pack 1. This makes it possible to provide safely when the battery pack 1 enters an abnormal condition.

Furthermore, in the battery pack 1 according to the first exemplary embodiment, the control board 5 as a control unit is mounted of the stair structure 4. The devices formed on the control board 5 detect a current condition of each of the battery cells 10, 11, 12, 13 and 14. This structure makes it possible to shorten the length between the control board 5 and each of the battery cells 10, 11, 12, 13 and 14. It is therefore possible to decrease electric resistance between them and the length of wires with which the control board 5 and the battery cells are connected together. Still further, this structure makes it possible to decrease the mounting space on which the battery pack 1 and the control unit. This can improve the mounting of the battery pack to a motor vehicle having a limited mounting space.

Still further, the battery pack 1 has the safety valves 10c, 11c, 12c, 13c and 14c and the discharge duct 6. The safety valves 10c, 11c, 12c, 13c and 14c are formed on the end surface of the exterior cases 10e, 11e, 12e, 13e and 14e between the positive electrode terminal and the negative electrode terminal of the battery cells. The safety valves 10c, 11c, 12c, 13c and 14c are broken when the pressure of the inside of the battery cells excesses a predetermined pressure value. The inner wall surface of the discharge duct 6 faces the safety valves 10c, 11c, 12c, 13c and 14c. The safety valves 10c, 11c, 12c, 13c and 14c are exposed to the inside of the discharge passage 6a formed in the discharge duct 6. The bus bars 20, 21, 22, 23, 24 and 25 connect the electrode terminals of the adjacent battery cells in a vertical direction and a horizontal direction, as previously described.

Because the electrode terminals of the adjacent battery cells are connected in a vertical direction and a horizontal direction only, the electrode terminals of the adjacent battery cells are not connected together in any diagonal direction or an oblique direction. This improved electric connection makes it possible to prevent each of the bus bars 20, 21, 22, 23, 24 and 25 from interfering with the safety valves 10c, 11c, 12c, 13c and 14c. Accordingly, even if the safety valve is broken and gas is emitted from the battery cell through the safety valve, it is possible for the gas to be discharged from the inside of the battery cell through the broken safety valve into the discharge passage 6a without preventing the gas from flowing by the bus bars 20, 21, 22, 23, 24 and 25. This makes it possible to smoothly convey the gas through the discharge passage 6a and to discharge the gas to the outside of the battery pack 1.

That is, the first exemplary embodiment provides the battery pack 1 having the structure capable of smoothly introducing gas from the inside of the battery cell to the discharge passage 6a and of discharging the gas to the outside separated from the battery pack 1.

Second Exemplary Embodiment

A description will be given of a battery pack 1A according to a second stacked group exemplary embodiment with reference to FIG. 9 and FIG. 10.

Figure 9:
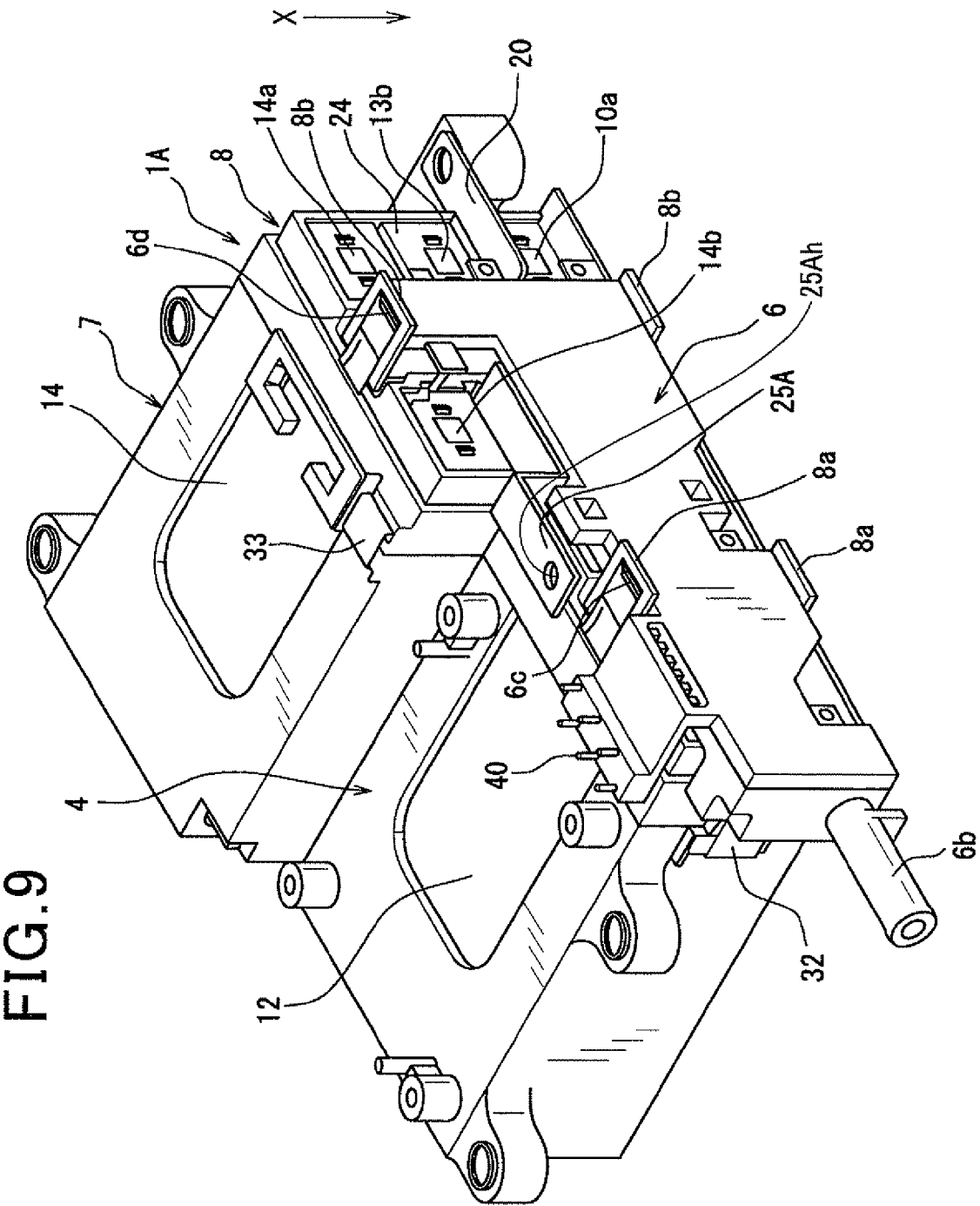
FIG. 9 is a perspective view showing the arrangement of a battery pack having the discharge duct according to a second exemplary embodiment of the present invention.

FIG. 9 is a perspective view showing the arrangement of the battery pack 1A having the discharge duct 6 according to a second exemplary embodiment of the present invention. FIG. 10 is a plan view showing a structure in which the cover case 60 is removed from the battery pack 1A according to the second exemplary embodiment of the present invention;

The same components between the second exemplary embodiment and the first exemplary embodiment will be referred with the same reference characters and numbers. The explanation of the same components between the second exemplary embodiment and the first exemplary embodiment is omitted here for brevity.

Figure 10:
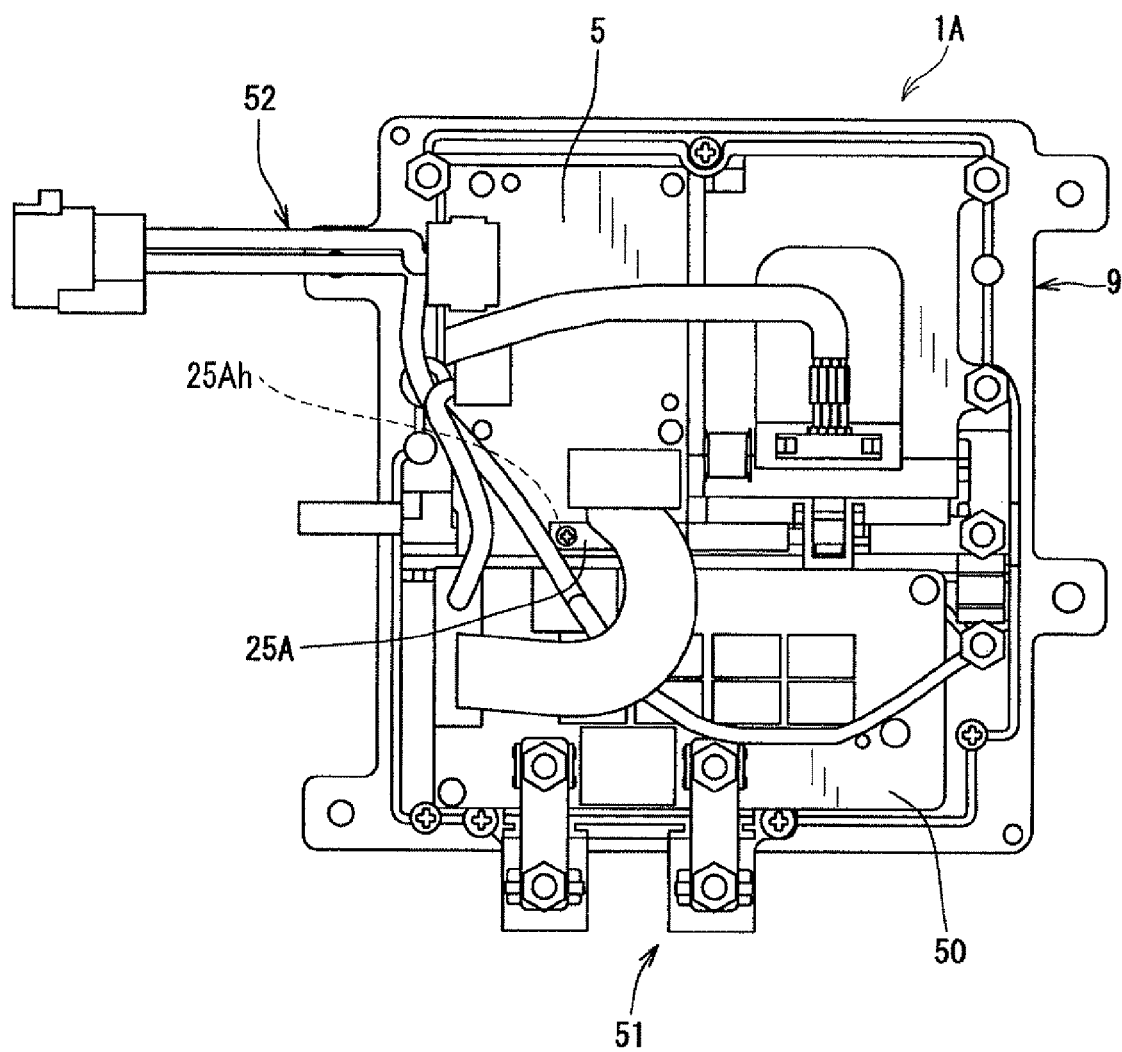
FIG. 10 is a plan view showing a structure in which the cover case is removed from the battery pack according to the second exemplary embodiment of the present invention.

As shown in FIG. 9 and FIG. 10, the battery pack 1A has a bus bar 25A which is electrically connected to the control board 5. On the other hand, the bus bar 25 used in the battery pack 1 according to the first exemplary embodiment is electrically connected to the power board 50, as previously explained.

As shown in FIG. 9, the penetration hole 25Ah is formed at one end part of the bus bar 25A which extends toward the lower step of the stair structure 4.

As shown in FIG. 10, the bus bar 25A is fixed to the control board 5 through the penetration hole 25Ah by using a bolt and a nut in order to electrically connect the bus bar 25A to a predetermined terminal formed in the control board 5.

Third Exemplary Embodiment

A description will be given of a battery pack 1B according to a third exemplary embodiment with reference to FIG. 11 and FIG. 12.

Figure 11:
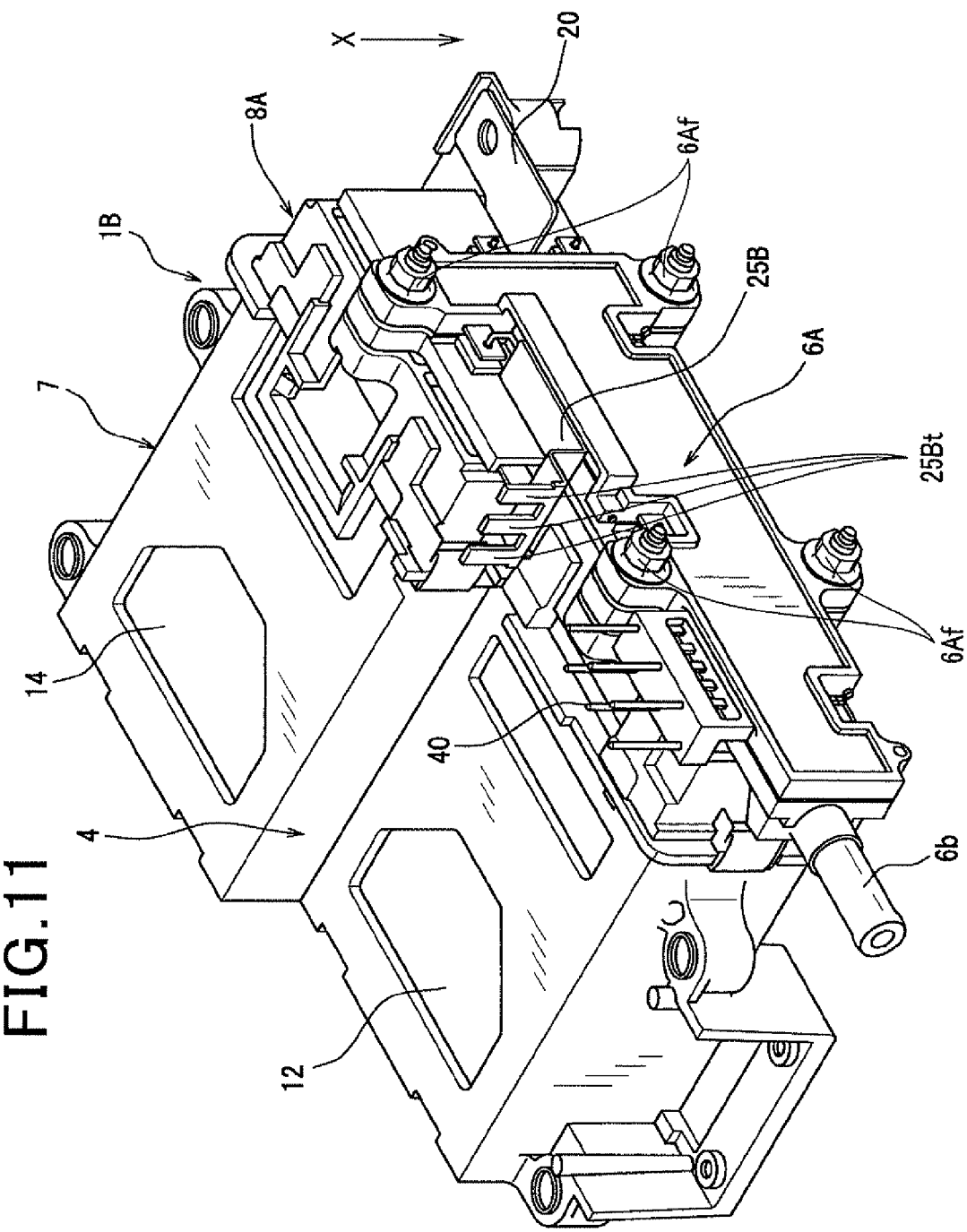
FIG. 11 is a perspective view showing an arrangement of a battery pack having a discharge duct according to a third exemplary embodiment of the present invention.

FIG. 11 is a perspective view showing an arrangement of the battery pack 1B having a discharge duct 6A according to the third exemplary embodiment of the present invention.

Figure 12:
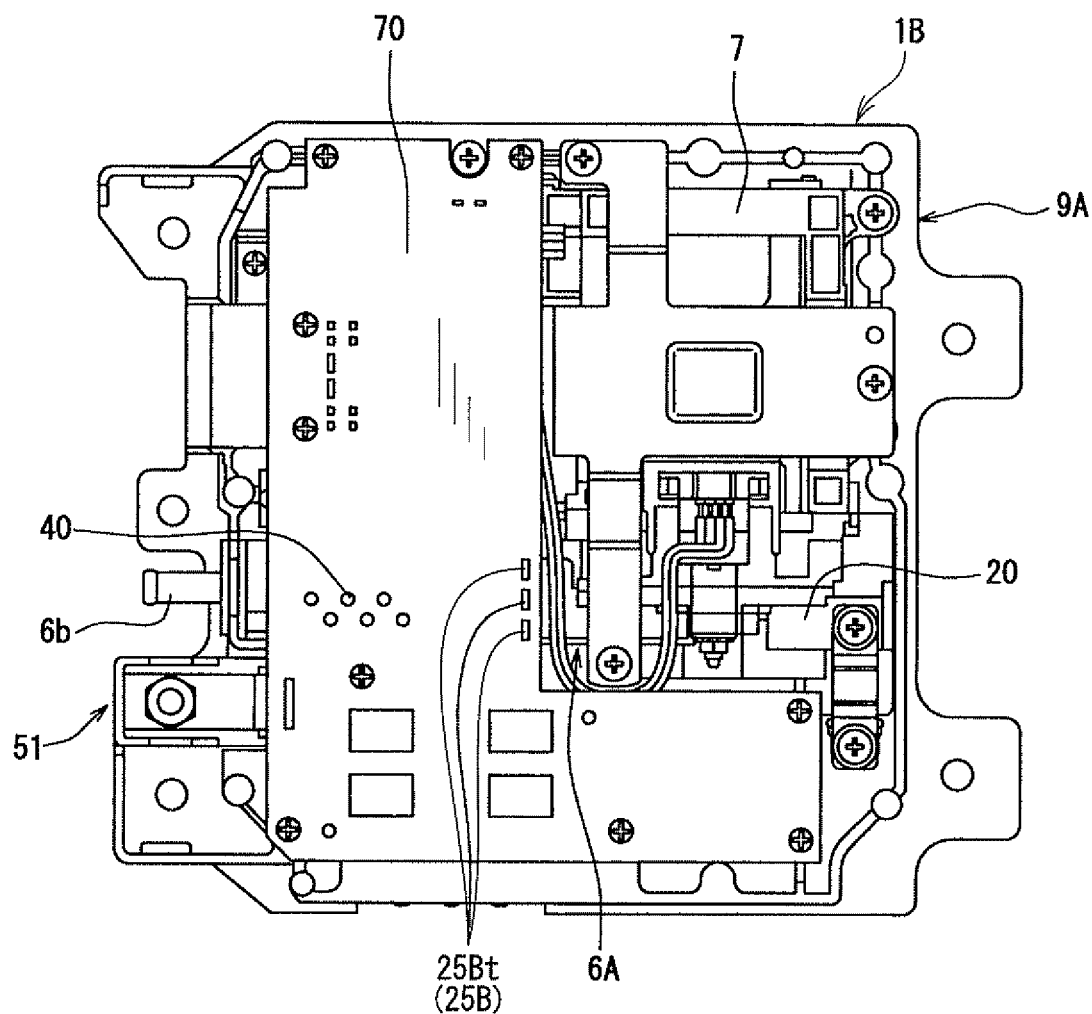
FIG. 12 is a plan view showing a structure in which the cover case is removed from the battery pack according to the third exemplary embodiment of the present invention.

FIG. 12 is a plan view showing a structure in which the cover case 6 is removed from the battery pack 1B according to the third exemplary embodiment of the present invention.

The same components between the third exemplary embodiment and the first exemplary embodiment will be referred with the same reference characters and numbers. The explanation of the same components between the third exemplary embodiment and the first exemplary embodiment is omitted here for brevity.

The battery pack 1B according to the third exemplary embodiment shown in FIG. 11 and FIG. 12 has a control board 70 on which the control board 5 and the power board 50 are mounted.

As shown in FIG. 11 and FIG. 12, the control board 70 is electrically connected to the voltage detection terminal 40 and a bus bar 25B.

As shown in FIG. 11, the bus bar 25B has three terminals 25Bt extending toward the upper direction, namely, toward the thickness direction X of the battery pack 1B from the control board 5 in the stair structure 4. The control board 70 is omitted from FIG. 11.

As shown in FIG. 12, the three terminals 25Bt of the bus bar 25B are electrically connected to predetermined terminals of the control board 70. The voltage detection terminal 40 extending from the stair structure 4 toward the upper direction, namely, toward the thickness direction X of the battery pack 1B is electrically connected to the control board 70 (namely, the voltage detection circuit formed on the control board 70) arranged on the lower step in the stair structure 4.

As shown in FIG. 11, a discharge duct 6A having four fixing parts 6Af. The two fixing parts 6Af are formed at the upper part and the bottom part of a center part of the discharge duct 6A. The other two fixing parts 6Af are formed at the upper part and the bottom part of one end part along a longitudinal direction of the fixing parts 6Af. The discharge duct 6A is fixed to an insulation cover 8A through the four fixing parts 6Af by using bolts and nuts as fixing members.

The discharge duct 6A is forcedly pushed and fastened to the insulation cover 8A and the packing members 30 and 31 are compressed by the bolts and nuts as the fixing members. This makes it possible to increase the air tightness between the surface of each of the safety valves 10c, 11c, 12c, 13c and 14c and the discharge passage 6a.

As shown in FIG. 12, main components such as the battery pack 1B, the power board 50 and the terminal block 51 are arranged on and fixed to the floor plate 9A. The control board 70 is mounted on and fixed to the battery pack 1B. The floor plate 9a supports the battery pack 1B, the power board 50, the terminal block 51, etc. as the main components of the battery pack 1.

The floor plate 9A having the battery pack 1B is covered and packed with the cover case 60. This makes it possible to easily and safety mount the battery pack to a motor vehicle.

Fourth Exemplary Embodiment

A description will be given of a battery pack 1C according to a fourth exemplary embodiment with reference to FIG. 13.

Figure 13:
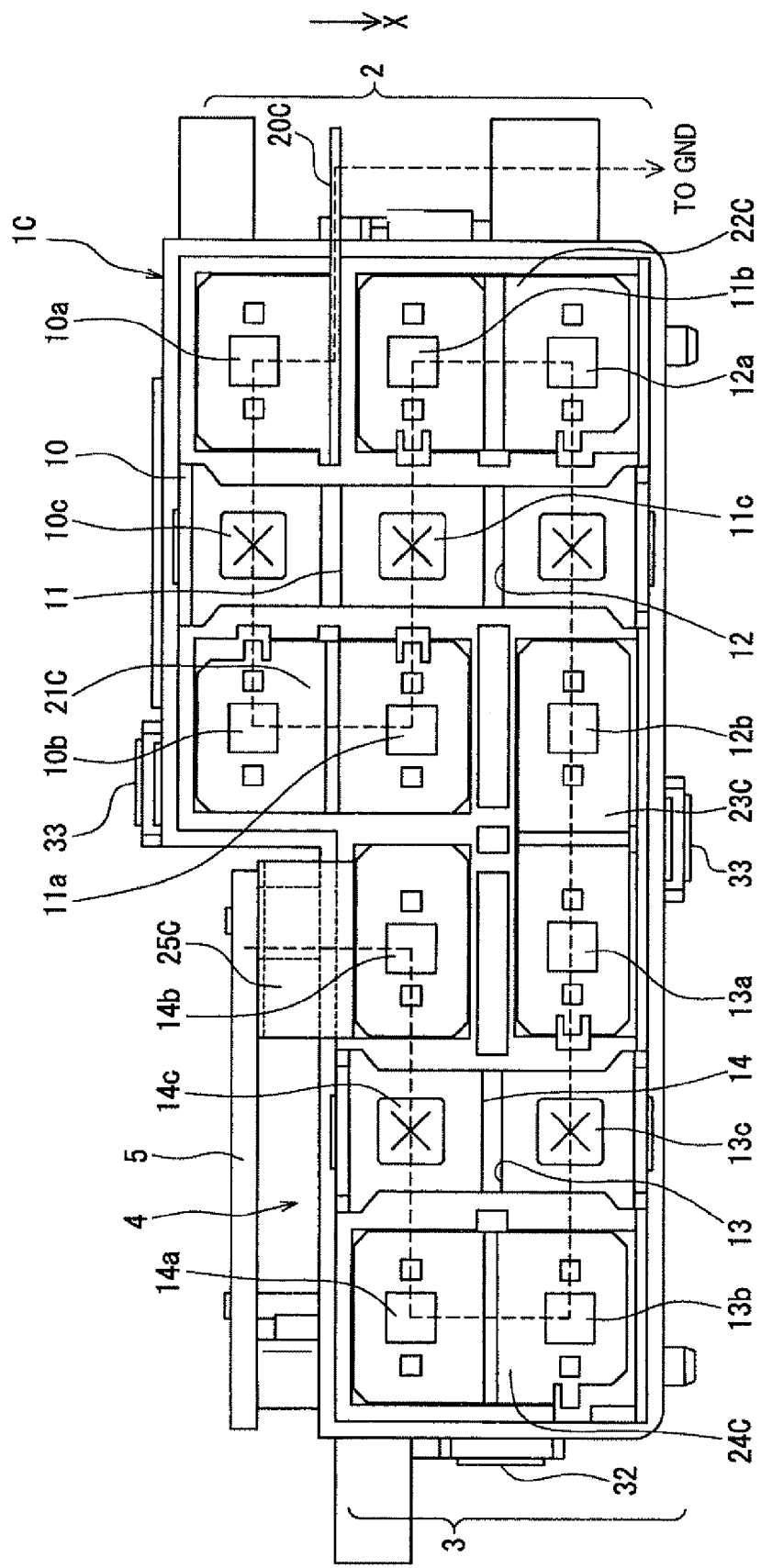
FIG. 13 is a front view showing an arrangement of a battery pack according to a fourth exemplary embodiment of the present invention.

FIG. 13 is a front view showing an arrangement of the battery pack 1C according to the fourth exemplary embodiment of the present invention.

The same components between the fourth exemplary embodiment and the first exemplary embodiment will be referred with the same reference characters and numbers. The explanation of the same components between the fourth exemplary embodiment and the first exemplary embodiment is omitted here for brevity.

The battery pack 1C according to the fourth exemplary embodiment has an improved connection passage, through which battery cells 10, 11, 12, 13 and 14 are electrically connected in series, which is different from the connection passage of the battery pack 1 according to the first exemplary embodiment. The battery pack 1C according to the fourth exemplary embodiment further has the bus bars 20C, 21C, 22C, 23C, 24C and 25C. The shape of each of the bus bars 20C, 21C, 22C, 13C, 24C and 25C according to the fourth exemplary embodiment is different from the shape of each of the bus bars 20C, 21C, 22C, 13C, 24C and 25C according to the first exemplary embodiment.

As shown in FIG. 13, the five battery cells 10, 11, 12, 13 and 14 forming the battery pack 1C are divided to the first stacked group 2 and the second stacked group 3. The battery cells 10, 11, 12, 13 and 14 are stacked in the thickness direction X of the battery pack 1C. That is, the battery cells 10, 11 and 12 with the exterior cases 10e, 11e and 12e are stacked in the first stacked group 2 in the thickness direction X. Each of the battery cells 10, 11 and 12 is separated to each other by a predetermined interval in the thickness direction X.

The battery cells 13 and 14 with the exterior cases 12e and 14e are stacked in the second stacked group 3 in the thickness direction X. the battery cells 13 and 14 are separated by the predetermined interval in the thickness direction X.

The negative electrode terminal 10a of the battery cell 10 is electrically connected to the bus bar 20C. The bus bar 20C is fixed to a motor vehicle (not shown) by a screw. This electrical connection makes the bus bar 20C to be earthed through the motor vehicle.

As shown in FIG. 13, one end of the bus bar 20C is extended from the upper side of the first stacked group 2 toward the right side of the first stacked group 2 in a lateral direction which is perpendicular to the thickness direction X of the battery pack 1C.

The positive electrode terminal 10b of the battery cell 10 is electrically connected to the negative electrode terminal 11a of the battery cell 11 through the bus bar 21C.

The positive electrode terminal 11b of the battery cell 11 is electrically connected to the negative electrode terminal 12a of the battery cell 12 through the bus bar 22C.

The positive electrode terminal 12b of the battery cell 12 is electrically connected to the negative electrode terminal 13a of the battery cell 13 through the bus bar 23C.

The positive electrode terminal 13b of the battery cell 13 is electrically connected to the negative electrode terminal 14a of the battery cell 14 through the bus bar 24C.

The positive electrode terminal 14b of the battery cell 14 is electrically connected to the bus bar 25C. The bus bar 25C is electrically connected and fixed to the control board 5 by a screw or soldering.

As indicated by a dotted line shown in FIG. 13, the above electrical connection makes it possible to electrically connect the battery cells 10, 11 and 12 in the first stacked group 2 in series from the upper side toward the bottom side in the thickness direction X, and to electrically connect the battery cells 13 and 14 in the second stacked group 3 in series from the bottom side toward the upper side along the thickness direction X of the battery pack 1C.

The current flows in a character "U" shaped direction, namely, in a vertical direction and a lateral direction through the battery cells connected in the second stacked group 3 and the first stacked group 2 from the bus bar 20C to the control board 5 as indicated by the dotted line shown in FIG. 13. The bus bars 20C, 21C, 22C, 23C, 24C and 25C connect the battery cells 10, 11, 12, 13 and 14 in the vertical direction (thickness direction X) and the horizontal direction.

Other Modifications

The concept of the present invention is not limited by the structures of the battery packs 1, 1A, 1B and 1C according to the first to fourth exemplary embodiments previously described.

For example, the first to fourth exemplary embodiments previously described shows the structure in which the battery cells are divided into the first stacked group 2 and the second stacked group 3 and the first stacked group 2 and the second stacked group 3 are arranged in a lateral direction which is perpendicular to the thickness direction X. The structure of the first stacked group 2 and the second stacked group 3 makes the stair structure 4 shown in FIG. 1, for example. The difference in height between the first stacked group 2 and the second stacked group 3 is the thickness of one battery cell.

However, the concept of the present invention is not limited by the structure. For example, it is possible for the difference in height between the first stacked group 2 and the second stacked group 3 is the thickness of two or more battery cells.

Still further, it is possible for a battery pack according to the present invention to have a plurality of the stair structures having a different thickness in the thickness direction X of the battery pack.

In the structure of the battery packs 1, 1A, 1B and 1C according to the first to fourth exemplary embodiments previously described, the battery cells are stacked along the thickness direction X. However, the concept of the present invention is not limited by the structure. For example, it is possible for each battery cell to have an electrode terminal which projects from the exterior case 10e, 11e, 12e, 13e, 14e toward the upper side of each battery cell.

In the structure of the battery pack according to the first to fourth exemplary embodiments previously described, the battery case 7 is separated from the insulation cover 8. However, the concept of the present invention is not limited by the structure. For example, it is possible to use a single member composed of the battery case 7 and the insulation cover 8.

Other Features and Effects of the Present Invention

In the battery pack as another aspect of the present invention, a control board is arranged on a lower step part of the stair structure. Various devices mounted on the control board 5 detect a state of each of the battery cells 10, 11, 12, 13 and 14.

This structure of the battery pack makes it possible to shorten the distance between the devices mounted on the control board 5 and the battery cells, further to decrease electric resistance between the devices and the battery cells. Still further, this structure makes it possible to decrease the distance of wires to be used for detecting a state of each battery cell, and to avoid a complicated wiring connection between the control devices and the battery cells. Thus, this structure provides a reduced size of the battery pack, and increases a mountability of the battery pack to various devices and apparatus such as a motor vehicle.

In accordance with another aspect of the present invention, the battery pack further has a plurality of safety valves 10c, 11c, 12c, 13c, 14c, and a discharge duct 6. In the battery pack, each of the safety valves 10c, 11c, 12c, 13c, 14c is formed on an area between the positive electrode terminal and the negative electrode terminal of the corresponding battery cell, and the safety valve of the battery cell is broken when a pressure of an inside of the battery cell excesses a predetermined pressure. The discharge duct 6 has a discharge passage 6a. An inside wall surface of the discharge passage 6a faces the safety valves. The adjacent battery cells are connected to each other in a horizontal direction and the thickness direction X as a vertical direction of the battery pack through the bus bars.

In the structure of the battery pack according to the present invention, because the adjacent battery cells are electrically connected in a vertical direction (as the thickness direction X) and a horizontal direction only, not in any oblique direction, and not in any curved direction, through the bas bars.

This makes it possible to avoid the bus bars and the safety valves of the battery cells from overlapping each other, and to avoid the bus bars from completely covering the safety valves of the battery cells. When gas is discharged from a fault or damaged battery cell, this structure of the battery pack according to the present invention makes it possible to smoothly discharge such gas from the damaged battery cell to the inside of the discharge passage 6a in the discharge duct 6.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A battery pack comprising a plurality of battery cells, a plurality of bus bars, a plurality of safety valves, and a discharge duct, each of the battery cells being covered with an exterior case having a rectangular parallelepiped shape, each of the battery cells having a positive electrode terminal and a negative electrode terminal, the positive electrode terminal and the negative electrode terminal extending from the exterior case, and the battery cells being connected in series through the bus bars to make a series connection structure, wherein the battery cells are divided into a plurality of stacked groups so that the battery cells are stacked in each of the battery stacked groups along a thickness direction of the exterior case of each of the battery cells and all the battery cells are electrically connected in series by the bus bars, one stacked group has a smaller number of the battery cells than the number of the battery cells in the other stacked group, and the stacked groups arranged in a battery case make a stair structure, the positive electrode terminal of the battery cell positioned at one end of the battery cells connected in series in the series connection structure is arranged adjacent to the stair structure, the stair structure has a lower step part and a higher step part formed in the thickness direction along which the battery cells are stacked, with a control board being arranged on the lower step part of the stair structure, and devices mounted on the control board detect a state of each of the battery cells, a power board and the control board are mounted on a single board, the power board being arranged outside of the stair structure, the power board having power elements mounted thereon, and the battery cells are connected in series through a voltage detection terminal of the battery pack, the voltage detection terminal being electrically connected to the single board on which the control board and the power board are mounted.

2. The battery pack according to claim 1, wherein
the positive electrode terminal and the negative electrode terminal of each of the battery cells and the bus bars are arranged on the same end surface of the battery case in which the battery cells are arranged within each of the stacked groups.

3. The battery pack according to claim 1, wherein
the positive electrode terminal and the negative electrode terminal of each of the battery cells, the bus bars, the safety valves and discharge duct are arranged on the same end surface of the battery case in which the battery cells are arranged in each of the stacked groups.

4. The battery pack according to claim 1, wherein
each of the safety valves is formed on an area between the positive electrode terminal and the negative electrode terminal of the corresponding battery cell, and the safety valve of the battery cell is broken when a pressure of an inside of the battery cell exceeds a predetermined pressure, the discharge duct has a discharge passage, an inside wall surface of the discharge passage faces the safety valves, and the bus bars are arranged in a horizontal direction and a vertical direction of the battery pack to electrically connect the adjacent battery cells to each other, the bus bars being disposed at locations spaced from the safety valve such that the bus bars are not disposed between the safety valves and the discharge passage along a direction perpendicular to the thickness direction along which the battery cells are stacked.

* * * * *